Figure 1:
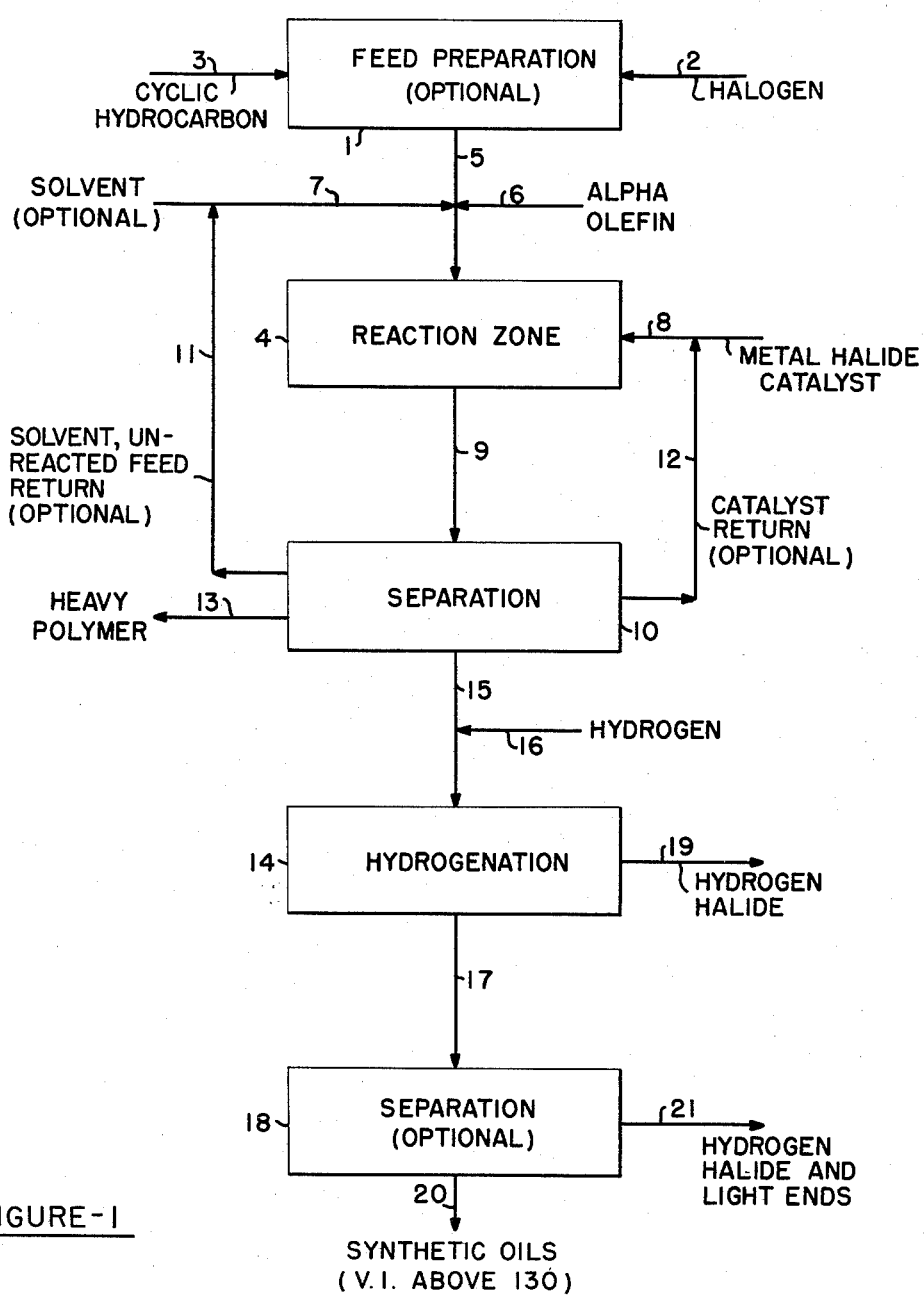

Sept. 19, 1961        D. V. FAVIS        3,000,981

SYNTHESIS OF HYDROCARBON TYPE LUBRICATING OILS

Filed Dec. 19, 1958        6 Sheets-Sheet 1

Dimitrios V. Favis    Inventor

By Frank T. Johmann    Attorney

Sept. 19, 1961 D. V. FAVIS 3,000,981
SYNTHESIS OF HYDROCARBON TYPE LUBRICATING OILS
Filed Dec. 19, 1958 6 Sheets-Sheet 2

MOLAR RATIO OF THE REACTANTS VS. PHYSICAL PROPERTIES FOR C1-MCP OILS
(OLEFINIC REACTANTS: N-1-TETRADECENE)

Dimitrios V. Favis   Inventor

By Frank T. Johmann   Attorney

Sept. 19, 1961 D. V. FAVIS 3,000,981
SYNTHESIS OF HYDROCARBON TYPE LUBRICATING OILS
Filed Dec. 19, 1958 6 Sheets-Sheet 3

MOLAR RATIO OF THE REACTANTS VS. PHYSICAL PROPERTIES OF CL-BENZENE OILS (OLEFINIC REACTANT: N-1-TETRADECENE)

Dimitrios V. Favis   Inventor

By Frank T. Johnson   Attorney

Sept. 19, 1961 D. V. FAVIS 3,000,981
SYNTHESIS OF HYDROCARBON TYPE LUBRICATING OILS
Filed Dec. 19, 1958 6 Sheets-Sheet 6

YIELD VS. MOLAR RATIO OF THE REACTANTS (OLEFINIC REACTANT: N-l-TETRADECENE)

Dimitrios V. Favis    Inventor

By Frank T. Johnson    Attorney

3,000,981
SYNTHESIS OF HYDROCARBON TYPE LUBRICATING OILS

Dimitrios V. Favis, Sarnia, Ontario, Canada, assignor to Esso Research and Engineering Company, a corporation of Delaware
Filed Dec. 19, 1958, Ser. No. 781,773
6 Claims. (Cl. 260—666)

This invention is concerned with the synthesis of hydrocarbon lubricating oils having high viscosity indexes. More particularly, this invention pertains to the synthesis of lubricating oils by the reaction of alpha olefins with halogenated cyclic hydrocarbon compounds, followed by hydrogenation of the reaction product.

In brief compass, this invention proposes a process for synthesizing lubricating oil. The process comprises reacting a substantially straight chain alpha olefin, having in the range of 6 to 30 carbon atoms, with a halogenated hydrocarbon ring compound, preferably monohalogenated, the ring portion thereof having at least 5 carbon atoms. The halogenated ring compound may be saturated or unsaturated, branched or unbranched, and will contain at least one chlorine atom per molecule. The mole ratio of the cyclic compound to the alpha olefin is in the range of 1:10 to 5:1 and preferably 1:10 to 2:1.

The reaction is carried out in liquid phase at a temperature between the melting and boiling points of the mixture. The reaction time is normally less than one hour at atmospheric pressure. The catalyst used is a metal halide catalyst, for example, a Friedel-Crafts catalyst such as $AlCl_3$ or the more recent alkyl metal halide type of catalyst.

The halogen-containing oil product obtained from this reaction is catalytically hydrogenated to obtain a hydrogenated oil having a halogen content below 0.1 weight percent and good lubricating oil properties. The halogen-containing oil product can also be substantially dehalogenated by thermal dehydrohalogenation. This appears to be particularly true for oils prepared by use of chlorinated methylcyclopentane as a non-olefinic reactant.

The hydrogenated, substantially halogen-free oils obtained have viscosity indexes above 130, and quite often above 140. They have ASTM pour points below +20° F., and preferably below —20° F.

By proper control of reaction conditions, the finished oils have the desired viscosities, for lubricating oils, i.e., in the range of 30 to 100 Saybolt seconds, Universal (SSU) at 210° F. This has been one of the problems of the prior art processes, i.e., in attempting to synthesize synthetic oils from olefins, products having undesirable viscosities were obtained. Usually a product of too high a viscosity was obtained.

Normally the oleaginous products of this invention have average molecular weights in the range of 300 to 700. One of the features of this process is that a product having a quite narrow distribution of molecular weights is obtained in good yields. A product meeting the above limitations of viscosity index and viscosity is obtained in yields greater than 50 wt. percent based upon total charged, and preferably greater than 70 wt. percent based upon olefin charged.

Substantially straight chain alpha olefins having in the range of 6 to 30 carbon atoms, preferably 10 to 16, are used as one of the reactants. By substantially straight chain is meant that at least 80% of the carbon atoms thereof are in a straight chain. Mixtures of the olefin can, of course, be used. Some extraneous olefins of other types can be tolerated but it is preferred that of the olefins charged to the reaction zone, at least 85% be the above described alpha olefins.

The halogenated cyclic compound used as the other reactant has the formula: R—X wherein R is a saturated or unsaturated, branched or unbranched hydrocarbon ring, preferably of the cyclopentyl series and X is a halogen atom preferably chlorine which is preferably substituted directly upon the hydrocarbon ring.

This includes compounds such as chlorinated cyclopentene, monochlorobenzene, monochlorinated methyl cyclopentane, etc. It excludes such compounds as chlorinated toluene, non-halogenated materials such as cyclopentadiene, and non-cyclic materials such as monochlorohexane. These latter have proved to be unsatisfactory for the purposes of this invention. These materials will react to form a product, but they yield products that do not have satisfactory lubricating oil properties.

Mixtures of the halocyclic compounds can, of course, be used and some contaminants can be tolerated. It is preferred, however, that of the hydrogenated structures entering into the reaction zone, at least 80% consist of the above-identified halocyclic compounds.

The reaction mixture can contain other diluting or solvent-like materials that do not interfere with the course of the reaction, such as n-hexane or n-heptane. It is preferred, however, that the alpha olefin and the halocyclic compounds comprise at least 50% of the materials charged to the reaction zone.

It is believed that the desirable lubricating oil properties are obtained by a proper balancing of conditions in the reaction zone. It is further believed that several types of reactions occur, such as alkylation, polymerization, telomerization, i.e., dimerization and trimerization of the olefin, which is then terminated by the non-olefinic reactant. The desired reaction is favored by proper selection of reactants and reaction conditions, such as the type of non-olefinic reactant, the mole ratio of the reactants, the catalyst, and the physical conditions under which the reaction is carried out, principally temperature. The halocyclic compound not only enters into the reaction to some extent, but exerts a solvent effect modifying the reaction. It appears that the polymerization of the olefin is dampened by the proper solvent such that products of excessively high viscosity are avoided. In the case of cyclic olefins, such as cyclopentadiene, the monohalogenation of the cyclic compound appears to decrease the reactivity of it sufficiently so that over or excessive polymerization is avoided. Controlling the mole ratio of halocyclic compound to olefin is useful in controlling the reaction to some extent. The higher this ratio, within limits, the better the viscosity index of the product. The number of carbon atoms of the olefin has an appreciable effect on the pour point of the final oil. The smaller number of carbon atoms in the alpha olefin, generally speaking, the lower the pour point.

The hydrogenation of the chlorine-containing oil obtained from the reaction is carried out in a conventional manner and does not materially affect the viscosity or the pour point of the oil, the pour point and the viscosity in some cases being lowered by the hydrogenation. Hydrogenation, however, usually results in significant gains in viscosity index. These gains are to some extent proportional to the halocyclic compound to olefin molar ratio. The higher this ratio, the higher the gain in viscosity index because of hydrogenation.

The process of this invention will be described with reference to the drawing attached to and forming a part of this specification. The drawing schematically illustrates a flow plan of the present invention.

In the drawing, numeral 1 indicates the feed preparation. For example, in this zone chlorine supplied by line 2 can be added to a compound such as methyl cyclopentane supplied by line 3, in order to obtain the halocyclic reactant. This step is optional and is carried out in manners well known to the art. The halocyclic compound obtained is then passed to the reaction zone 4 by line 5. The alpha olefin is added by line 6, either to the halocyclic compound or directly to the reaction zone. A solvent, if used, is added by line 7.

A metal halide catalyst supplied by line 8 is used to catalyze the reaction. This can be a Friedel-Crafts type of catalyst, such as aluminum chloride or the more recently developed alkyl metal halide catalysts. These alkyl metal halide catalysts are solid, insoluble reaction products obtained by partially reducing a reducible, heavy transition halide of a group IVB or VIII metal, etc. with a reducing group I to III metal-containing material such as an organometallic compound of an alkali, alkaline earth, rare earth metal or zinc. They can also be advantageously prepared by reducing an appropriate metal compound with the aid of metallic aluminum or a mixture of aluminum and titanium, etc. A catalyst of this type can thus be prepared by reducing 1 mole of titanium tetrahalide, usually tetrachloride, to the corresponding trivalent or sub-trivalent titanium halide with about 0.2 to 100 moles of aluminum triethyl, triisobutyl or other aluminum alkyl compound of the formula RR'AlX. In this formula R, R' and X are preferably alkyl groups of 2 to 8 carbon atoms, although X may alternatively be hydrogen or a halogen, notably chlorine. The reduction is carried out by dissolving each of the two catalyst components in an inert solvent, preferably a $C_3$ to $C_{18}$ paraffin such as isopentane or n-heptane, and mixing the two solutions in the proper proportions at temperatures between freezing point of the mixture and 150° C. and in the absence of moisture, oxygen and sulfur impurities. The resulting precipitate in conjunction with some free aluminum alkyl compound is generally considered to constitute the actual active polymerization catalyst. Alternatively, it is possible to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1.

The metal halide catalyst is used in an amount in the range of 1 to 100 weight percent, based on combined reactants. The mole ratio of halocyclic compound to olefin is in the range of .1 to 5.0. The temperature of the reaction will be between the melting and boiling points of the reaction mixture and preferably between −25° to 500° F. The reaction pressure is preferably atmospheric. Higher or lower pressures, however, can be employed. The reaction time will vary with the other conditions, but will normally be about one hour. The reaction is continued until at least 50% of the alpha olefin charged is consumed and a product having a viscosity within the range of commercial grade lubricating oils, preferably 30 to 100 SSU at 100° F. is obtained in yields of at least 50 weight percent based on alpha olefin consumed.

The reaction can be carried out under an inert atmosphere such as under nitrogen, but is preferably carried out under a blanket of hydrogen halide.

After the reaction, the reaction mixture is passed by line 9 to a separation zone 10. This may comprise a distillation zone and a water washing step to remove traces of catalyst and hydrogen chloride dissolved in the oil. Here the solvent and unreacted feed is separated and, if desired, returned by line 11 to the reaction zone. Also, if desired, the metal halide catalyst can be separated and returned to the reaction zone by line 12. There will usually be some heavier oil or solid material formed, and this can be cut out in zone 10, and removed from the process by line 13. The remaining material, i.e., the halogen-containing product, is recovered and passed to hydrogenation zone 14 by line 15. At this point the hydrogenated oil boiling at temperatures higher than 600° F. is obtained in yields higher than 50% by weight based on olefin consumed in zone 4.

To the halogen-containing oil in line 15 hydrogen is added by line 16 or may be directly added to the hydrogenation zone.

The halogen-containing oil is hydrogenated in zone 14 to reduce its halogen content below .1 weight percent and preferably to remove the halogen entirely. This can be accomplished through the use of conventional hydrogenation catalysts such as nickel and palladium. The temperature depends on the optimum temperature of hydrogenation as the halide product and also on the temperature under which the halide of the metal catalyst is reduced to metal and hydrogen chloride. The catalyst can exist in any conventional form such as a fixed, gravitating or fluid bed. The hydrogenation practiced in this invention is conventional, and more specific conditions are known to those skilled in the art.

The hydrogenated product is removed from zone 14 by line 17 and the hydrogen halide formed is vented by line 19. The hydrogenated product may again be separated, if desired, in zone 18, e.g., a distillation zone. Thus, light ends and hydrogen halide formed by the hydrogenation can be removed from the oil and vented by line 21. If desired, the hydrogen halide drawn off by lines 19 and 21 can be recycled to the beginning of the process. The finished oil is removed from the process by line 20. It will have a boiling point in the range of 600° to 1050° F. and a pour point below +20° F. A predominant amount of the product formed, i.e., over 80%, has a boiling point in the range of 800° to 950° F., which indicates the selective nature of the reaction to producing a relatively narrow molecular weight range of product. All boiling points herein given are at atmospheric pressure.

The hydrogenated synthetic lubricating oil obtained is ideally suited for use in automotive engines. It can, of course, be used with other conventional additives such as neutralized, phosphosulfurized hydrocarbon detergents, zinc dialkyl dithiophosphate extreme pressure agents, trialkyl phenol antioxidants and polyolefin viscosity index improvers. The oils can be thickened to greases with conventional thickeners such as lithium 12 hydroxy stearate and calcium soap-calcium acetate complexes.

EXAMPLE I

*Raw materials*

The alpha olefins used in all of the following examples are commercially available manufactured by Humphrey-Wilkinson, Inc., North Haven, Conn., have the following inspections, they were 98–99% monoolefins; of the monoolefin, 3–8% were not alpha. Other impurities were mainly the next lower and higher members of the series, traces of unconverted alcohol, aldehyde and other oxygenated materials and diolefins.

The chlorobenzene (mono) was a certified (Fisher Scientific Company) reagent having a boiling range between 131.4 and 131.8° C.

The chloromethylcyclopentane was prepared in the laboratory by batch chlorination of a Technical Grade, and 95 mole percent minimum purity methylcyclopentane (Philips Petroleum Company). The chlorinated product contained about 50 wt. percent monochlorinated methylcyclopentane, about 20 wt. percent dichlorinated methylcyclopentane and about 10 wt. percent polychlorinated methylcyclopentane; the balance was nonchlorinated material.

*Equipment*

The batch reactor, for the chlorination of the monoolefinic reactants, consisted of a cylindrical tube equipped with condenser and a fritted glass dispenser for the dispersion of the inlet gas chlorine. The outlet line of this reactor was connected with a gas washing bottle, equipped with a fritted glass dispenser, containing normalized sodium hydroxide water solution.

The polymerization, telomerization or condensation reaction was carried out in a conventional reaction flask equipped with mechanical stirrer, thermometer, condenser, inlet and outlet gas lines and an addition pressure equalizing funnel.

Conventional filtering, water washing, and stripping equipment was used.

The hydrogenations were carried out using a conventional pressure reactor (autoclave).

Procedures

The chlorination of methylcyclopentane was carried out at about 70° F. The reaction was initiated by tungsten light. The hydrogen chloride evolved was blown through a predetermined amount of normalized sodium hydroxide solution, the neutralization of which indicated the completion of the chlorination. Preferably, one gram atom of chlorine was allowed to react per mole of methylcyclopentane.

The reaction of olefins with the mono-halogenated reactant was preferably carried out in the presence of an equal volume of a solvent such as n-hexane or n-heptane. An amount of solvent, equal to the volume of the reactants, together with 10 wt. percent on olefin charge of aluminum chloride, were first introduced into the reactor. The reactants were premixed and added drop-wise by means of an addition funnel in such a manner that the reacting temperature of 0° F. remained practically constant. In an alternative procedure, the monoolefin was premixed with the solvent and the catalyst. The addition of olefin was made in the same manner as above using the addition funnel. In both procedures, a constant current of HCl gas was blown through the reacting system. After the reactants were added, the stirred system was left to react at the predetermined temperature of 0° F. for one hour. After the completion of the reaction, the reaction mixture was filtered over Celite analytical filter aid. The filtrate was hydrolyzed with cool distilled water to remove traces of catalyst and of dissolved hydrogen chloride. The filtrate was stripped at 400° F. 10 mm. Hg pressure to remove light materials. The resultant halogen-containing oil was hydrogenated at 800 p.s.i.g. and 400° F. using 100 wt. percent on charge, of U.O.P. nickel catalyst. Under these conditions, the hydrogen chloride produced during the hydrogenation reacted with nickel to form nickel chloride whose reduction at temperatures of about 400° F. is substantially low. In this manner, the gas phase of the reacting system was, practically, hydrogen chlorine free. Hence, the progress of the reaction was detectable. In large scale operations, however, hydrogenation temperatures higher than 400° F. can be used, i.e., temperatures in the range of 350° to 550° F. and pressures in the range of 250 to 1500 p.s.i.g. Under these conditions, the nickel chloride is reduced in the presence of hydrogen to nickel metal and HCl so that with the same amount of catalyst, an indefinite amount of halogenated oils can be hydrogenated. Upon completion of the hydrogenation, the reaction mixture was filtered to remove catalyst and stripped at 400° F., 10 mm. Hg pressure to remove light materials. The stripped material was the final hydrogenated synthetic oil.

Results

The following tables present the results of these experiments. Each run is indicated by a run number (the run numbers which were originally assigned are reported in the tables). In some cases the products were not hydrogenated. In cases where the product was hydrogenated, this is indicated or the run number is preceded by the letter H. The conditions used for each run were as described above, or are more particularly indicated in each table. Some runs are repeated in the tables for comparative purposes.

(A) Polymerization of n-1-olefin

Table I shows that when normal alpha olefins of 10 to 16 carbon atoms are polymerized in the presence of aluminum chloride at 0° F., they give oils of up to 200 SSU viscosity at 210° F. and having a viscosity index ranging from 123 to 127. The pour point depends on the number of carbon atoms in the olefin. Normal heptane was used as a solvent in these reactions. The catalyst concentration was 10 weight percent on olefin charge. This table shows that while olefins can be polymerized quite readily to oils, the polymerization is quite difficult to control to obtain the proper viscosity in the final oil product.

TABLE I

[Reaction temp. 0° F., aluminum chloride catalyst, n-heptane solvent, hydrogen chloride blanket]

| Run No. | Alpha Olefin | Visc. SUS at 210° F. | V.I. | Pour Point, ° F. | Yield Wt. percent on Olefin Charge |
|---|---|---|---|---|---|
| 121 | Decene ($C_{10}$) | 153 | 123 | −30 | 83 |
| 122 | Dodecene ($C_{12}$) | 184 | 125 | −25 | 92 |
| 120 | Tetradecene ($C_{14}$) | 215 | 126 | +10 | 82 |
| 113 | Hexadecene ($C_{16}$) | 214 | 127 | +40 | 94 |

(B) Reactions of n-1-olefins with various non-olefinic reactants

As mentioned previously, this invention is dependent upon use of a non-olefinic halogen-containing reactant to modify the olefin polymerization in order to get a product of the desired viscosity. Table II illustrates the use of these non-olefinic halogen-containing reactants to control viscosity indexes while obtaining the desired low viscosity oils.

For comparison purposes, oils were also prepared using the corresponding non-halogenated compounds as non-olefinic reactants. The solvent was n-heptane. The products were not hydrogenated.

TABLE II.—PHYSICAL PROPERTIES OF OILS [1] PREPARED BY REACTING n-1-TETRADECENE AND VARIOUS NON-OLEFINIC MATERIALS

[Molar ratio of the reactants 1, 10% $AlCl_3$ catalyst, 0° F. reaction temperature HCl blanket]

| Run No. | Non-olefinic Reactant | Yield, Wt. percent on Olefin Charge | Visc. SUS at 210° F. | V.I. | Pour Pt., ° F. | Chlorine, Wt. percent |
|---|---|---|---|---|---|---|
| 141 | Monochlorinated methylcyclopentane | 66 | 50.8 | 131 | −5 | 3.26 |
| 151 | Methylcyclopentane | 82 | 137.0 | 130 | +20 | 0.85 |
| 152 | Monochlorinated toluene | 71 | 704.8 | 102 | +55 | 4.02 |
| 173 | Toluene | 112 | 36.7 | 95 | −25 | |
| 150 | Chlorobenzene | 116 | 59.4 | 138 | −5 | 6.02 |
| 172 | Benzene | 90 | 70.8 | 137 | +5 | |
| 156 | Monochlorinated n-hexane | 78 | 478.5 | 125 | 0 | 3.18 |
| 119 | n-hexane | 82 | 215.0 | 126 | +10 | |

[1] Stripped at 400° F., 10 mm. Hg pressure.

The reactions were carried out at 0° F. for 1 hour in the presence of 10 wt. percent aluminum chloride (based on weight of olefin charge) using n-heptane as a solvent under a blanket of hydrogen chloride.

Table II shows the physical inspections of the products. It will be seen that the viscosity varies from 37 to 705 SUS at 210° F. indicating that the mechanism of the reaction depends on the type of non-olefinic reactant. Chlorinated methylcyclopentane gave a product having a viscosity at 210° F. of 50.8 SUS and a V.I. of 131, whereas the reaction with methylcyclopentane gave a material having a much higher viscosity of 137 SUS at 210° F.

The reactions of chlorinated toluene and toluene alone were entirely different; here chlorotoluene gave a polymerization or a condensation product as shown by the high viscosity, of 705 SUS at 210° F. Non-chlorinated toluene on the other hand gave a light product of 36.7 SUS viscosity and a surprisingly low V.I. of 95. The yield of 112 wt. percent on olefin charge and the low viscosity of the product indicate that the reaction was probably direct alkylation.

Both chlorobenzene and benzene gave products having the same V.I. of 137 but different viscosities at 210° F. (59.4 vs. 70.8 SUS respectively); the yields as wt. percent on olefin charge were also different, being 116 wt. percent and 90 wt. percent respectively.

Non-cyclic reactants such as chlorinated n-hexane and n-hexane produced still different oils. Polymerization of n-1-tetradecene in the presence of n-hexane gave a material of 215 SUS viscosity at 210° F. whereas the reaction of the same olefin with monochlorinated normal hexane gave a material having a much higher viscosity of 478 SUS at 210° F. Here again, as in the case of chlorotoluene, the chlorinated non-olefinic reactant promoted the formation of a high viscosity product.

Products prepared from chlorinated reactants contained from 3.2 to 6.0 wt. percent chlorine. Amounts as large as these indicate considerable participation of non-olefinic material in the reaction. A small amount of chlorine, about 0.85 wt. percent was found in the reaction products obtained from non-chlorinated non-olefinic reactants. This was probably a result of addition of the hydrogen chloride promoter to the olefinic bonds.

(C) *Removal of chlorine by hydrogenation* the V.I., viscosity and pour was determined. Data were obtained for both the non-hydrogenated and hydrogenated products. Normal 1-tetradecene was used throughout the experiments.

Figure 2:
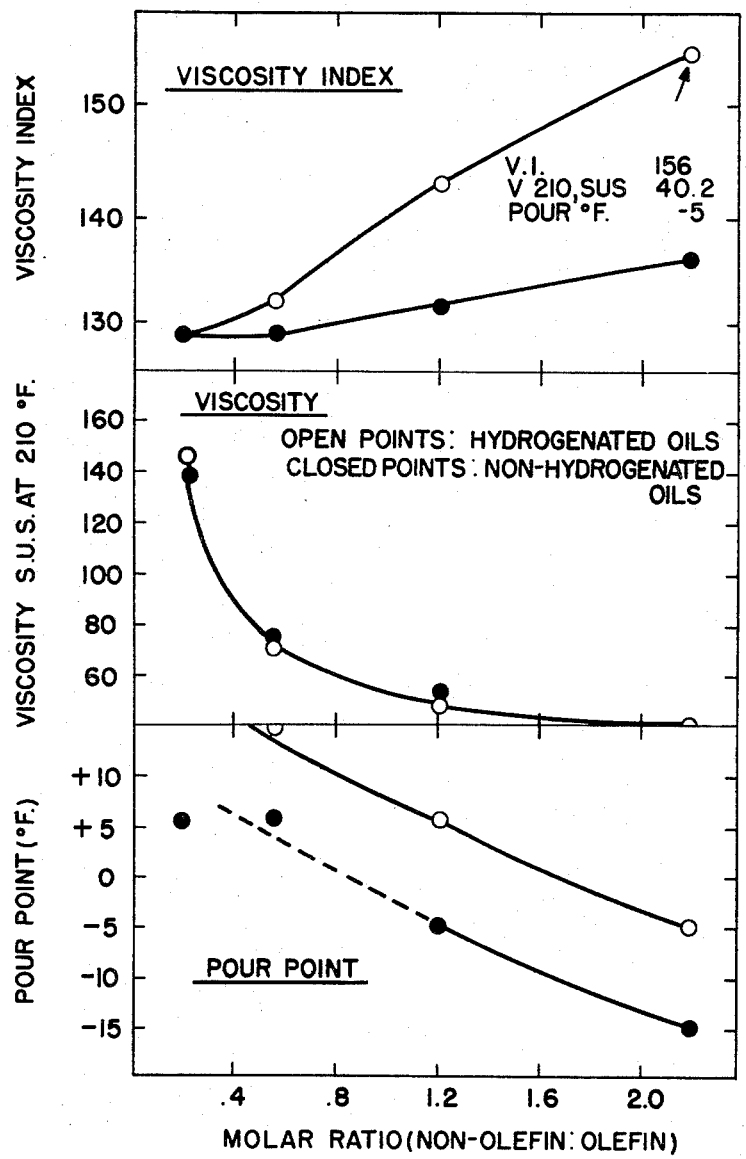

The results for the oil made with monochlorinated methylcyclopentane are shown in FIGURE 2. In the case of viscosity index the increase in molar ratio had only a small effect on the non-hydrogenated oil. After hydrogenation the effect of molar ratio was quite noticeable, increasing the V.I. by some 28 points from 128 to 156. Changing the molar ratio from .2 to 2.2 had a remarkable effect on the viscosity which decreased from 140 to 41 SUS at 210° F. Hydrogenation had little effect on this property. As far as pour point is concerned, the increase in molar ratio from 0.2 to 2.2 lowered the pour point from about +5 to −15° F. Hydrogenation increased the pour point by about 10° F. in all cases.

Figure 3:
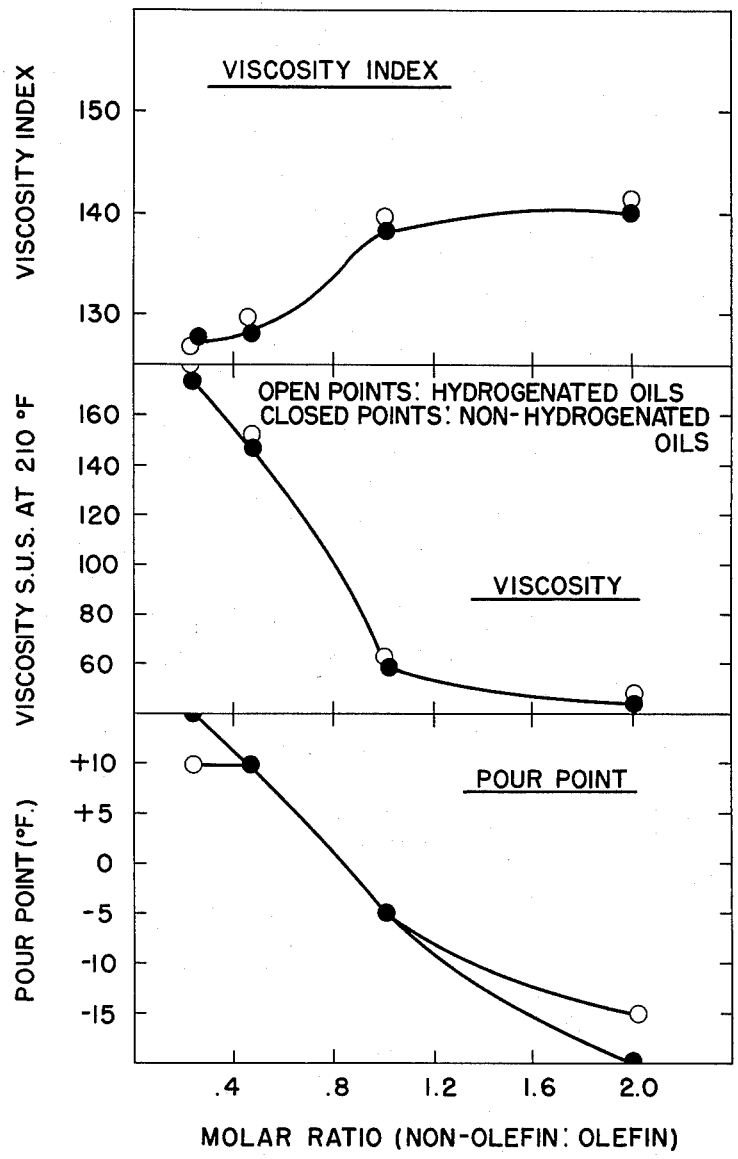

The results of similar studies using chlorobenzene are shown in FIGURE 3. Over the range of 0.2 to 2.2 molar ratio, the viscosity varied from 180 to about 45 SUS at 210° F. The viscosity index had values between 127 and 140 and the pour point between +10 and −20° F. Hydrogenation had practically no effect on these properties. This was probably a result of the inability of hydrogenation to remove chlorine from this type of oil.

Runs were made to determine the effect of the number of carbon atoms in the olefin on the pour and V.I. of the oil. The olefins were varied from $C_{10}$ to $C_{16}$, in a

TABLE III.—REMOVAL OF CHLORINE FROM TWO TYPICAL OILS [1]

[10 wt. percent based on olefin feed of $AlCl_3$ catalyst, 0° F. reaction temperature, HCl blanket]

| Run No. | Reactants | Yield, Wt. Percent on total charge | Visc., SUS at 210° F. | V.I. | Pour Pt., °F. | Cl, Wt. Percent | Iodine No. |
|---|---|---|---|---|---|---|---|
| 150 | n-1-Tetradecene: Chlorobenzene Molar Ratio 1— After Hydrogenation (ALH-56). | 73 | 59.4 | 138 | −5 | 6.02 | 2.5 |
|  |  |  | 61.8 | 139 | −5 | 3.32 | 1.7 |
| 162 | n-1-Dodecene: Monochlorinated Methyl-cyclopentane Molar Ratio 1.34—After Hydrogenation (ALH-62).[2] | 41 | 42.3 | 134 | −55 | 5.02 | 47.3 |
|  |  |  | 42.7 | 139 | −35 | nil | 28.1 |

[1] Stripped at 400° F., 10 mm. Hg pressure.
[2] One-third of this material escaped as light end during the stripping.

Table III shows the inspections of two typical oils before and after hydrogenation. They were products of reactions of $C_{12}$ and $C_{14}$ olefins with monochlorinated methylcyclopentane (Cl—MCP) and chlorobenzene. Hydrogenation completely removed the chlorine from the Cl—MCP oils whereas the hydrogenated oils from chlorobenzene retained 55% of their chlorine content. Hydrogenation increased the viscosity index of the Cl—MCP oils, prepared with a $C_{12}$ olefin, from 134 to 139 and increased the pour point from −55 to −35° F. Oils made by reacting chlorobenzene with n-1-tetradecene had a viscosity index of 138 and a pour point of −5° F. These values were unchanged in the hydrogenation step.

Chlorinated methylcyclopentane-type oils had a high iodine number of 47.3. This was anticipated since it is known that alkyl chlorides, especially secondary and tertiary chlorides, are heat unstable, and are easily dehydrochlorinated to unsaturation. In this respect the hydrogenation was not complete since it only reduced the iodine number to 28.1. In contrast, the iodine number of chlorobenzene oils was small, probably because of the high stability of aromatic chlorides.

(D) *Reaction variables*

Two basic reaction variables have been found which influence the physical properties of the synthetic oils. These are the molar ratio of the reactants, and the number of carbon atoms in the olefin.

The molar ratio of the reactants (non-olefin:olefin) was varied over a range of 0.2 to 2.0 and its effect on product using monochlorinated methylcyclopentane (Cl—MCP) as the non-olefinic reactant. The results are given in Table IV.

TABLE IV.—EFFECT OF NUMBER OF CARBON ATOMS IN THE OLEFIN ON THE PROPERTIES OF THE OIL [1]

[Cl—MCP: Olefin, molar ratio about 1]

| Run Number | C-Number of Olefin | Yield, Wt. Percent on Total Charge | Visc. SUS at 210° F. | V.I. | Pour Point, °F. |
|---|---|---|---|---|---|
| 163 | 10 | 33.5 | 43.2 | 111 | −65 |
| After hydrogenation |  |  | 44.8 | 131 | −70 |
| 158 | 12 | 59 | 41.5 | 127 | −55 |
| After hydrogenation |  |  | 44.0 | 139 | −30 |
| 141 | 14 | 41.5 | 50.8 | 131 | −5 |
| After hydrogenation |  |  | 47.0 | 143 | +5 |
| 83 | 16 | 62.5 | 50.5 | 137 | +25 |
| After hydrogenation |  |  | 53.5 | 144 | +40 |

[1] Stripped at 400° F., 10 mm. Hg pressure.

As shown in the above table, the number of carbon atoms of the alpha olefin reactant can be used to control the pour point of the oil. The smaller the number of carbon atoms of the olefin, the lower the pour point obtained as demonstrated in Table IV.

(E) *Distillation data*

Figure 4:
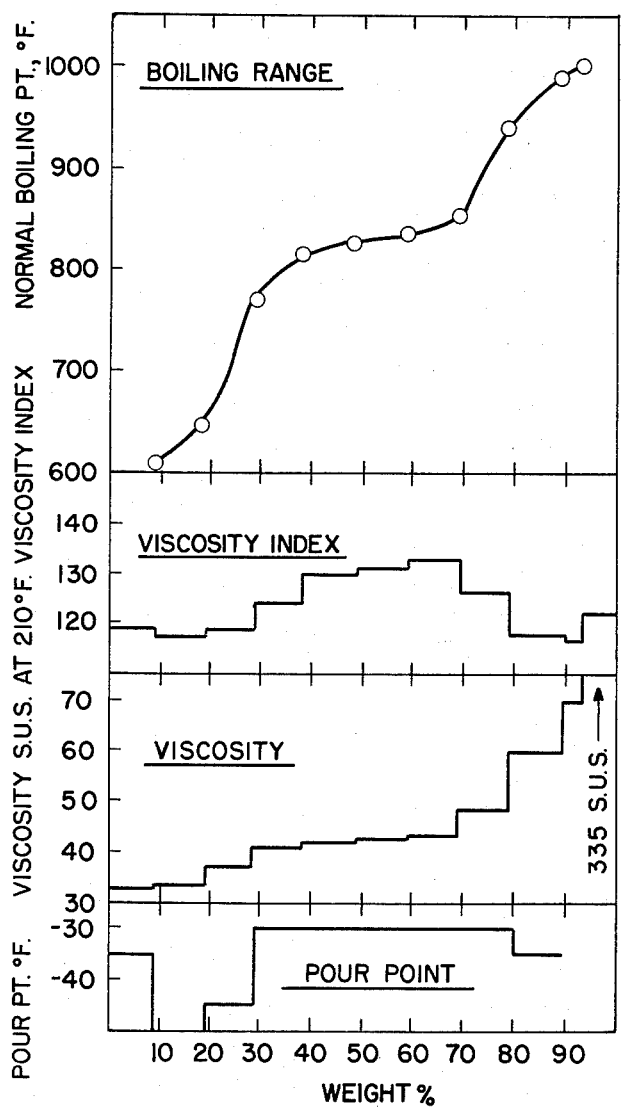

The distillation data of an oil made with monochlorinated methylcyclopentane and n-1-dodecene is shown in FIGURE 4. It had a viscosity index of 139, a viscosity of 42.7 SUS at 210° F. and a pour point of −35° F. The boiling range from the 0 to 93.5% point was 612 to 1005° F. All the fractions had a viscosity index between 117 and 134. The 38 to 80% fraction, which boiled over the range 820° to 940° F., had a viscosity index above 130. The viscosities of the overhead fractions varied from 32.5 to 70 SUS at 210° F. All of the fractions had a pour of −30° F. or lower.

The bottoms of the distillation representing 6.5 wt. percent of the charge had a viscosity index of 123, a viscosity at 210° F. of 332 SUS and an average molecular weight of 1320. Apparently, both the concentration and the molecular weight of this material were too small for it to act as a V.I. improver. Six percent of the bottoms dissolved in a 10 grade base oil raised the V.I. 11 points and the viscosity 2.0 seconds at 210° F. This improvement in V.I. with little increase in viscosity is similar to that encountered with blends of low and high viscosity materials.

(F) Viscosity-shear characteristics

Figure 5:
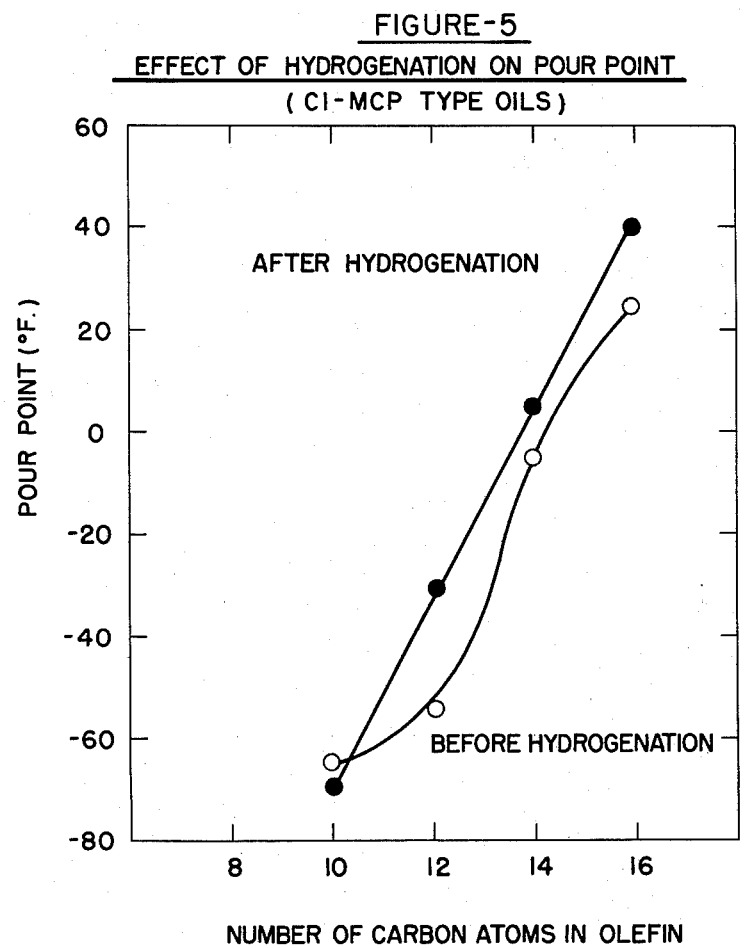

One of the possible reaction mechanisms in the manufacture of monochlorinated methylcyclopentane (Cl—MCP) oil is polymerization of the long chain olefin. High polymer, if present, would act as a V.I. improver and show temporary breakdown at high rates of shear. It appeared desirable to determine if any loss in viscosity occurred when the synthetic oil was exposed to a high shearing stress. For this purpose, the viscosity was determined at rates of shear up to about 13,000 sec.$^{-1}$, using a pressure capillary-type viscometer. The temperature was varied from 0 to −20° F. A 10 grade mineral oil dewaxed to −25° F. was used as reference. The results as well as the inspections of oils are shown in FIGURE 5. It will be seen that the viscosity of the synthetic oil showed no loss in viscosity except at the highest shear rate. This was possibly due to frictional heat build-up at the high operating pressures. The viscosity of the mineral oil decreased in a similar manner.

(G) Yields

Yields based on total charge and amount of olefin consumed in the reaction, in both monochlorinated methylcyclopentane (Cl—MCP) and chlorobenzene oils, were studied as functions of molar ratio of reactants. This was done to find conditions leading to maximum yield of product.

Figure 6:
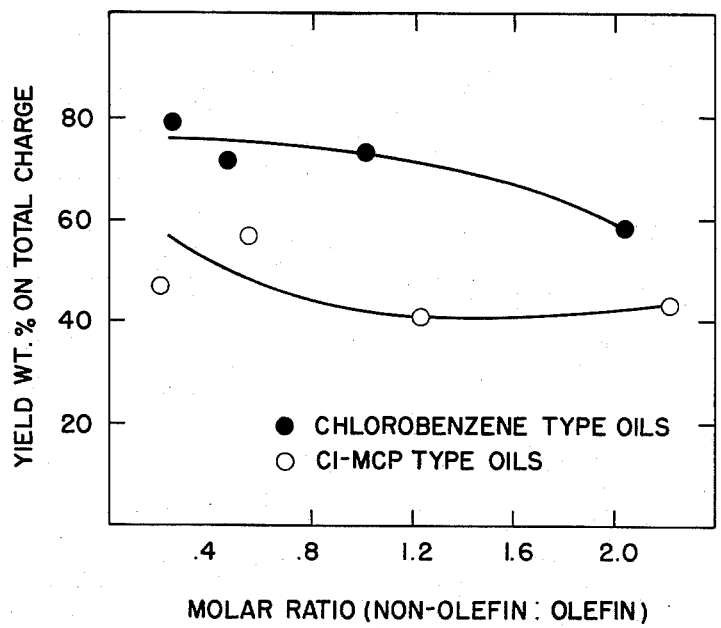

The data obtained, illustrated in FIGURE 6, show that the overall yield of chlorobenzene oils decreased from 80 to 60% as the molar ratio increased (i.e., where the moles of non-olefinic reactant per mole of olefin are increased) from 0.2 to 2.0. A similar change in molar ratio for the Cl—MCP reaction decreased the yield from about 60 to 42%.

Having described this invention, what is sought to be protected by Letters Patent is succinctly set forth in the following claims.

What is claimed is:

1. A process for synthesizing a lubricating oil comprising: reacting a substantially straight chain alpha olefin having in the range of 6 to 30 carbon atoms with an organic material selected from the group consisting of branched and unbranched, halogenated hydrocarbon ring compounds, containing 5 or more carbon atoms in the ring and having substituted directly upon the hydrocarbon ring at least one halogen atom per molecule, the mole ratio of said organic material to said olefin being in the range of .1 to 5.0; the reaction being carried out in the liquid phase at a temperature between the melting point and boiling point of the reaction mixture in the presence of catalyzing amounts of a metal halide catalyst until a yield of at least 50 wt. percent based upon alpha olefin added of a halogen-containing reaction product is obtained; catalytically hydrogenating said product to a hydrogenated oil having a halogen content below 0.1 weight percent; and recovering from said hydrogenated oil a synthetic lubricant boiling in the range of 600° to 1000° F. having a viscosity in the range of 30 to 100 SUS at 210° F., a viscosity index above 130, and a pour point below +20° F.

2. The process of claim 1 wherein said synthetic lubricant has a molecular weight in the range of 300 to 700 Staudinger.

3. The process comprising reacting a substantially straight chain alpha olefin having in the range of 6 to 30 carbon atoms with a halocyclic hydrocarbon having the formula:

$$R—X$$

wherein R is selected from the group consisting of branched and unbranched hydrocarbon rings, having 5 to 6 carbon atoms per molecule, X is a halogen atom which is substituted directly upon a hydrocarbon ring; the mole ratio of said halocyclic hydrocarbon to olefin being in the range of 0.1 to 2.0; said reaction being carried out in liquid phase at a temperature between the melting and boiling points of the reaction mixture through the use of a catalyzing amount of a polyvalent metal halide catalyst, followed by hydrogenating the product obtained from said reaction and recovering from the hydrogenated material a synthetic lubricant having a viscosity in the range of 30 to 100 SUS at 210° F. and a viscosity index above 130.

4. The process according to claim 3, wherein X is chlorine.

5. The synthetic lubricant product of claim 1.

6. The synthetic lubricant product of claim 3.

References Cited in the file of this patent

UNITED STATES PATENTS

| | | |
|---|---|---|
| 2,427,791 | Ipatieff et al. | Sept. 23, 1947 |
| 2,588,425 | Stevens | Mar. 11, 1952 |
| 2,678,957 | Fontana et al. | May 18, 1954 |
| 2,709,642 | Mann et al. | May 31, 1955 |
| 2,827,447 | Nowlin | Mar. 18, 1958 |
| 2,871,276 | Eiszner | Jan. 27, 1959 |
| 2,898,329 | Kittleson | Aug. 4, 1959 |
| 2,907,805 | Bestian et al. | Oct. 6, 1959 |